United States Patent [19]

Dehnert et al.

[11] 4,419,290
[45] Dec. 6, 1983

[54] DIAZO DYES HAVING A COUPLER COMPONENT ATTACHED TO A SULFAPHENYL-AZO-PHENYL-AZO-RADICAL

[75] Inventors: Johannes Dehnert, Ludwigshafen; Hermann Loeffler, Speyer, both of Fed. Rep. of Germany

[73] Assignee: BASF Aktiengesellschaft, Rheinland-Pfalz, Fed. Rep. of Germany

[21] Appl. No.: 159,474

[22] Filed: Jun. 16, 1980

Related U.S. Application Data

[63] Continuation of Ser. No. 896,383, Apr. 14, 1978.

[30] Foreign Application Priority Data

Apr. 27, 1977 [DE] Fed. Rep. of Germany ....... 2718620

[51] Int. Cl.³ .................. C09B 31/043; C09B 31/062; C09B 31/068; C09B 31/14
[52] U.S. Cl. .............................. 260/186; 260/154; 260/156; 260/160; 260/165; 260/176; 260/191; 260/205; 260/206
[58] Field of Search ................ 260/156, 165, 186, 187

[56] References Cited

U.S. PATENT DOCUMENTS

| | | | |
|---|---|---|---|
| 3,351,580 | 11/1967 | Koiue et al. ..................... | 260/160 |
| 3,823,131 | 7/1974 | Stingl ................................ | 260/186 |
| 3,883,502 | 5/1975 | Sommer et al. .................. | 260/165 |
| 3,946,024 | 3/1976 | Fleckenstein et al. .......... | 260/156 X |
| 3,960,831 | 6/1976 | Nickel et al. .................... | 260/186 |
| 4,022,763 | 5/1977 | Sommer et al. .................. | 260/186 |

FOREIGN PATENT DOCUMENTS 2007536  9/1971  Fed. Rep. of Germany ...... 260/165

*Primary Examiner*—Floyd D. Higel
*Attorney, Agent, or Firm*—Oblon, Fisher, Spivak, McClelland & Maier

[57] ABSTRACT

A dye which in free acid form corresponds to the formula:

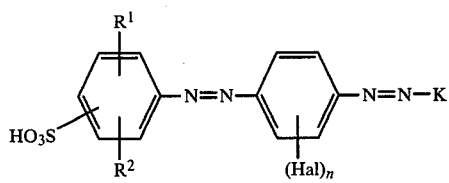

wherein
n is 1 or 2,
Hal is chlorine or bromine,

R¹ is hydrogen, chlorine, bromine, methyl, ethyl, methoxy or ethoxy,
R² is hydrogen, chlorine, bromine, methyl or methoxy,
R¹ and R² are a fused unsubstituted benzene ring or a fused benzene ring substituted by hydroxysulfonyl,
K is

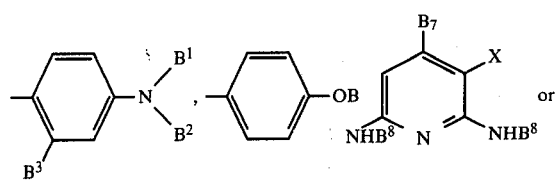

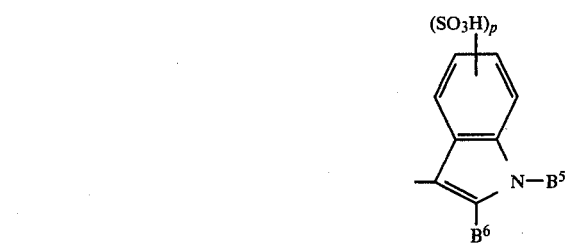

B is hydrogen, $C_1$ to $C_4$ alkyl or β-hydroxy-γ-chloropropyl,
B¹ is hydrogen, $C_1$ to $C_4$ alkyl, $C_2$ or $C_3$ hydroxyalkyl, allyl, $C_2$ or $C_3$ alkyl substituted by $C_1$ to $C_4$ alkoxy or $C_1$ to $C_4$ alkanoyloxy, β-chlorethyl, β-cyanoethyl, or β-hydroxy-γ-chloropropyl,
B² is the same as B¹ or is cyclohexyl, benzyl, sulfobenzyl, phenylethyl, sulfophenylethyl, phenyl or sulfophenyl,
B³ is hydrogen, chloro, methyl or $C_1$ to $C_4$ alkanoylamino,
B⁵ is hydrogen, allyl, methyl, β-cyanoethyl, β-carbamoylethyl or γ-carboxyethyl,
B⁶ is methyl or phenyl,
B⁷ is hydrogen or $C_1$ to $C_3$ alkyl,
B⁸ is hydrogen, $C_1$ to $C_8$ alkyl, $C_1$ to $C_8$ alkyl substituted by hydroxy, $C_1$ to $C_8$ alkoxy, phenoxy, phenyl, sulfophenoxy, sulfophenyl, carboxyl, or hydroxysulfonyloxy, cyclohexyl, norbornyl, phenyl, phenyl substituted by chlorine, methyl, methoxy or hydroxysulfonyl, $CH_2CH_2OCH_2CH_2OH$ or $(CH_2)_3(OC_2H_4)_qOB^9$,
B⁹ is hydrogen, $C_1$ to $C_4$ alkyl, cyclohexyl, benzyl, phenylethyl, phenyl, sulfobenzyl, sulfophenylethyl or sulfophenyl,
p is 0 of 1,
q is 1 or 2 and
X is cyano or carbamoyl.

The dyes are exceptionally suitable for dyeing nitrogen-containing fibers, and give dyeings with excellent fastness properties, amongst which the fastness to light and to wet treatments are outstanding.

2 Claims, No Drawings

DIAZO DYES HAVING A COUPLER COMPONENT ATTACHED TO A SULFAPHENYL-AZO-PHENYL-AZO-RADICAL

This is a continuation of application Ser. No. 896,383, filed Apr. 14, 1978.

The present invention relates to dyes which in the form of the free acids correspond to the general formula I

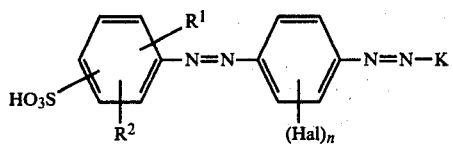

where

K is a radical of the coupling component of the phenol, aniline, naphthol, naphthylamine, aminonaphthol, acetoacetarylide, diaminopyridine, triaminopyridine, diaminopyrimidine, triaminopyrimidine and indole series.

n is 1 or 2,

Hal is chlorine or bromine, $R^1$ is hydrogen, chlorine, bromine, methyl, ethyl, methoxy or ethoxy, $R^2$ is hydrogen, chlorine, bromine, methyl or methoxy or $R^1$ and $R^2$ together are a fused benz ring, which may or may not be substituted by hydroxysulfonyl, and the hydroxysulfonyl group shown in ring A may instead be present in the fused ring.

The coupling components in the main correspond to the formulae

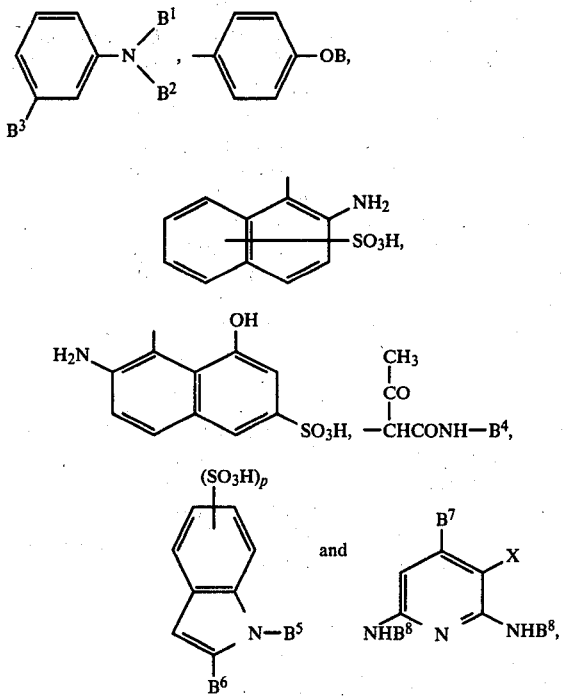

where

B is hydrogen, alkyl of 1 to 4 carbons or β-hydroxy-γ-chloropropyl, $B^1$ is hydrogen, alkyl of 1 to 4 carbon atoms, hydroxyalkyl of 2 or 3 carbon atoms, allyl, alkoxyethyl or alkoxypropyl (where alkoxy is of 1 to 4 carbon atoms), β-cyanoethyl, β-acetoxyethyl or β-acetoxypropyl, β-chloroethyl or β-hydroxy-γ-chloropropyl, $B^2$ is a radical $B^1$ or is cyclohexyl, benzyl, sulfobenzyl, phenylethyl, sulfophenylethyl, phenyl or sulfophenyl, $B^3$ is hydrogen, chlorine, methyl or acylamino, $B^4$ is phenyl which is unsubstituted or substituted by chlorine, methyl, methoxy or ethoxy, $B^5$ is hydrogen, allyl, methyl, β-cyanoethyl, β-carbamoylethyl or β-carboxyethyl, $B^6$ is methyl or phenyl, $B^7$ is hydrogen, methyl, ethyl or propyl, $B^8$ is hydrogen, or is alkyl of 1 to 8 carbon atoms which may or may not be interrupted by oxygen and is unsubstituted or substituted by hydroxyl, alkoxy of 1 to 8 carbon atoms, phenoxy, sulfophenoxy, phenyl, sulfophenyl, carboxyl or hydroxysulfonyloxy, or is cyclohexyl or norbornyl, or is phenyl which is unsubstituted or substituted by chlorine, methyl, methoxy or hydroxysulfonyl, X is cyano or carbamoyl and p is 0 or 1.

Examples of alkyl radicals B and $B^1$ are methyl, ethyl, propyl and butyl.

Specific examples of radicals $B^8$, in addition to those already mentioned above, are:

$CH_3$, $C_2H_5$, $C_3H_7$, $C_4H_9$, $C_5H_{11}$, $C_6H_{13}$, $C_8H_{17}$,

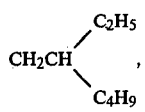

$CH_2CH_2OH$, $CH_2CHOHCH_3$, $CH_2CH_2CH_2OH$, $CHCH_2OCH_2CH_2OH$, $(CH_2)_3OCH_2CH_2OH$, $(CH_2)_3O(CH_2)_4OH$, $(CH_2)_6OH$, $CH_2CH_2OCH_3$, $CH_2CH_2OC_2H_5$, $CH_2CH_2OC_3H_7$, $CH_2CH_2OC_4H_9$, $CH_2CH_2OC_8H_{17}$,

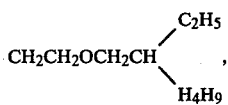

$CH_2CH_2OC_6H_{13}$, $(CH_2)_3OCH_2CH_2OCH_3$, $(CH_2)_3OCH_2CH_2OC_2H_5$, $(CH_2)_3OCH_2CH_2OC_4H_9$, $(CH_2)_3OC_2H_4OC_6H_5$, $(CH_2)_3OC_2H_4OC_6H_4SO_3H$, $CH_2C_6H_5$, $C_2H_4C_6H_5$, $CH_2COOH$, $(CH_2)_5COOH$, $CH_2CH_2OSO_3H$, $(CH_2)_3OSO_3H$,

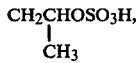

$CH_2C_6H_4SO_3H$, $CH_2CH_2C_6H_4SO_3H$, $(CH_3)_3(OC_2H_4)_2OCH_3$ and $(CH_3)_2(OC_2H_4)_2OC_2H_5$.

The compounds of the formula I can be prepared by reacting a diazonium compound of an amine of the formula II

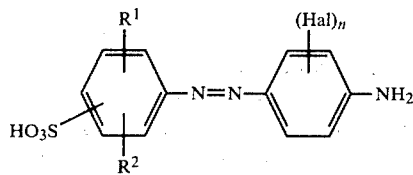

with a coupling component of the formula III

HK                                                                                     III.

The diazotization and coupling take place without any abnormal features. Details may be found in the Examples, where parts and percentages are by weight, unless stated otherwise.

The invention relates in particular to dyes of the formula I
wherein
n is 1 or 2,
Hal is chlorine or bromine,
$R^1$ is hydrogen, chlorine, bromine, methyl, ethyl, methoxy or ethoxy,
$R^2$ is hydrogen, chlorine, bromine, methyl or methoxy,
$R^1$ and $R^2$ are a fused unsubstituted benzene ring or a fused benzene ring substituted by hydroxysulfonyl,
K is

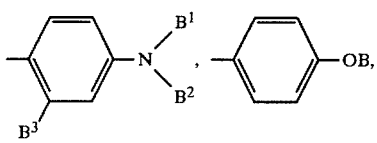

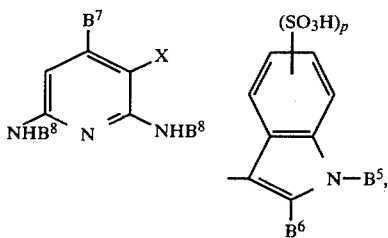

B is hydrogen, $C_1$ to $C_4$ alkyl or β-hydroxy-γ-chloropropyl,
$B^1$ is hydrogen, $C_1$ to $C_4$ alkyl, $C_2$ or $C_3$ hydroxyalkyl, allyl, $C_2$ or $C_3$ alkyl substituted by $C_1$ to $C_4$ alkoxy or $C_1$ to $C_4$ alkanoyloxy, β-cyanoethyl, β-chloroethyl or β-hydroxy-γ-chloropropyl,
$B^2$ is the same as $B^1$ or is cyclohexyl, benzyl, sulfobenzyl, phenylethyl, sulfophenylethyl, phenyl or sulfophenyl,
$B^3$ is hydrogen, chloro, methyl or $C_1$ to $C_4$ alkanoylamino,
$B^5$ is hydrogen, allyl, methyl, β-cyanoethyl, β-carbamoylethyl or β-carboxyethyl, $B^6$ is methyl or phenyl,
$B^7$ is hydrogen or $C_1$ to $C_3$ alkyl,
$B^8$ is hydrogen, $C_1$ to $C_8$ alkyl, $C_1$ to $C_8$ alkyl substituted by hydroxy, $C_1$ to $C_8$ alkoxy, phenoxy, phenyl, sulfophenoxy, sulfophenyl, carboxyl or hydroxysulfonyloxy, cyclohexyl, norbornyl, phenyl, phenyl substituted by chlorine, methyl, methoxy or hydroxysulfonyl, $CH_2CH_2OCH_2CH_2OH$ or $(CH_2)_3(OC_2H_4)_qOB^9$
$B^9$ is hydrogen, $C_1$ to $C_4$ alkyl, cyclohexyl, benzyl, phenylethyl, phenyl, sulfobenzyl, sulfophenylethyl or sulfophenyl,
p is 0 or 1,
q is 1 or 2 and
X is cyano or carbamoyl.

Compounds of particular industrial importance are those of the formula Ia

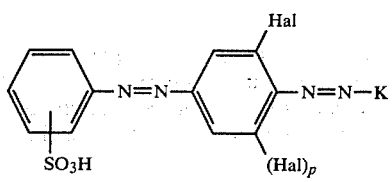

where p and K have the stated meanings.

The $SO_3H$ group in formula Ia is preferably in the p-position.

The coupling components are preferably derived from the aniline, phenol, indole or pyridine series.

The dyes of the formula I range from yellow to blue and may be used for dyeing nitrogen-containing fibers, especially natural polyamides and synthetic nylons, eg. nylon 6,6, nylon 6, wool or silk. Some of the dyeings obtained have very good fastness properties, especially fastness to light and to wet treatments.

EXAMPLE 1

A solution of 18.9 parts of sodium 3-bromo-4-amino azobenzene-4'-sulfonate in 250 parts by volume of water and 15 parts by volume of a 23 percent strength sodium nitrite solution is run into a solution of 20 parts by volume of 10 N hydrochloric acid and 2 parts of an adduct of sperm oil alcohol and ethylene oxide (in the ratio of 1:25) in 75 parts by volume of water, and the temperature is kept at from 15° to 20° C. by adding about 50 parts of ice. After stirring for two hours at this temperature and destroying the excess nitrous acid with amidosulfonic acid, the diazotization mixture is gradually combined with a solution of 15.5 parts of 2,6-bis-(2'-hydroxyethoxy-ethylamino)-3-cyano-4-methyl-pyridine in 200 parts by volume of water and 10 parts by volume of 10 N hydrochloric acid, the solution having first been cooled with 200 parts of ice. Coupling is terminated by adding 150 parts by volume of a saturated sodium acetate solution to bring the pH to 4.5. The reaction mixture is then brought to pH 10 with sodium hydroxide solution and heated to 80° C. to improve the filtrability. The dye of the formula

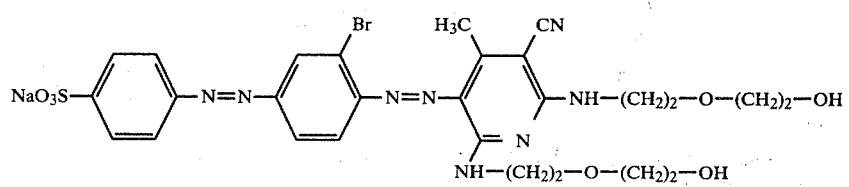

is then filtered off at room temperature, washed with a 5 percent strength sodium chloride solution and dried at 80° C. A red powder is obtained, which gives a red solution in water and dyes nylon fabrics in red hues having very good fastness to light and to wet treatments.

EXAMPLE 2

A suspension of the diazo compound of 16.7 parts of sodium 3-chloro-4-amino-azobenzene-4'-sulfonate, obtained as described in Example 1, is run, at from 5° to 10° C., into a solution of 12.3 parts of 2-(2'-hydroxyethoxy-ethylamino)-3-cyano-4-methyl-6-aminopyridine in 250 parts by volume of water and 6 parts by volume of 10 N hydrochloric acid and coupling is effected by adding 75 parts by volume of a saturated sodium acetate solution. To precipitate the dye of the formula

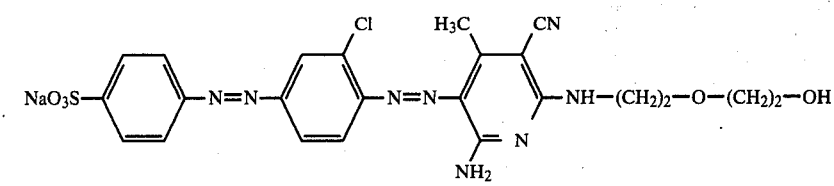

275 parts by volume of a saturated sodium chloride solution are added to the coupling mixture at from 80° to 90° C. After filtering off at room temperature, washing with 5% strength sodium chloride solution and drying at 80° C., a red water-soluble powder is obtained, which dyes nylon knitted fabrics in red hues having very good fastness to light and to wet treatments.

EXAMPLE 3

The suspension of the diazo compound obtained as described in Example 1 is freed from excess nitrous acid, a solution of 17.6 parts of 2-[(4-sulfophenyl)-ethylamino]-3-cyano-4-methyl-6-aminopyridine in 200 parts by volume of water and 3 parts by volume of a 50% strength sodium hydroxide solution is run in, and coupling is effected to slowly adding 100 parts by volume of a saturated sodium acetate solution.

The resulting dye of the formula

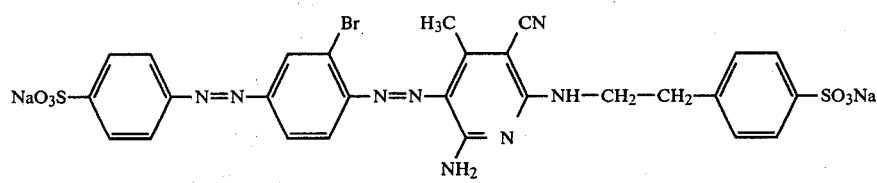

is salted out with 150 parts of sodium chloride, filtered off and dried at 80° C. This gives a red powder, which dyes nylon knitted fabric in very fast red hues.

EXAMPLE 4

A diazotization mixture obtained from 16.7 parts of sodium 3-chloro-4-amino-azobenzene-4'-sulfonate as described in Example 1, is run slowly into a solution of 14 parts of 2-phenylindole-N-propionamide in 400 parts by volume of dimethylformamide and coupling is effected by slowly adding 100 parts by volume of saturated sodium acetate solution. The dye of the formula

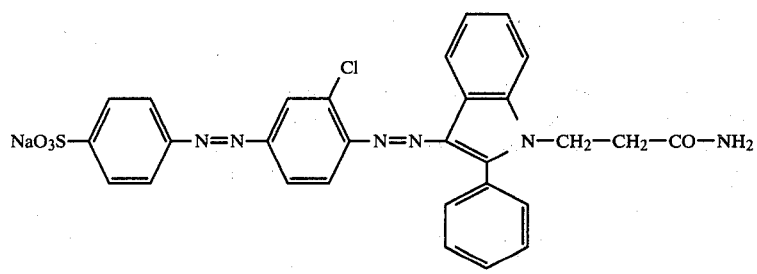

is filtered off, washed with 2% strength sodium chloride solution and dried at 80° C. This gives a red powder which dyes nylon material in fast yellowish red hues.

EXAMPLE 5

The diazotization mixture from Example 1 is run into an aqueous suspension of 2-amino-8-naphthol-6-sulfonic acid which has been obtained by precipitating a well-stirred solution of 13.8 parts of the sodium salt of this acid with hydrochloric acid until the pH is 2. After stirring overnight, at pH ≈1 and room temperature, coupling is complete. The dye of the formula

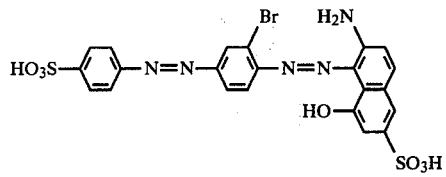

is neutralized by adding sodium hydroxide solution, precipitated by adding 500 parts by volume of a saturated sodium chloride solution, filtered off, washed with a 5% strength sodium chloride solution and dried at 80° C. This gives a bluish black powder which dyes synthetic nylon in a reddish blue hue having good fastness properties.

EXAMPLE 6

The suspension of the diazo compound obtained as described in Example 1 from 18.9 parts of sodium 3-bromo-4-amino-azobenzene-4'-sulfonate is run, at from 0° to +5° C., into a mixture of 50 parts of phenol, 100 parts by volume of water, 100 parts of ice and 18 parts of sodium carbonate. The dye of the formula

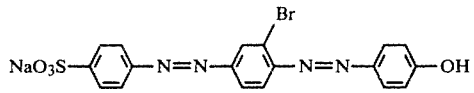

crystallizes out, and is filtered off, washed with a little cold water and dried at 80° C. A yellowish brown water-soluble powder is obtained, which dyes nylon fabric in yellowish orange hues having good fastness properties.

EXAMPLE 7

24.2 parts of the dye from Example 6 are dissolved in a warm mixture of 100 parts by volume of water and 300 parts by volume of ethanol. This solution is mixed with 3.5 parts of sodium carbonate, 3.5 parts of a 50% strength sodium hydroxide solution and 7.5 parts of ethyl chloride and the mixture is stirred for 24 hours at 100° C. in a closed vessel, resulting in an autogenous pressure of 7 atmospheres gauge. The reaction mixture is filtered at room temperature and the filter residue is washed with 200 parts by volume of 75% strength ethanol and dried at 80° C. The resulting dye, of the formula

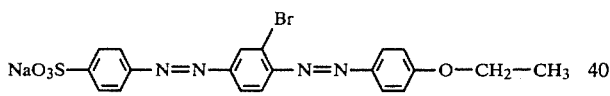

dyes nylon material in yellowish orange hues having very good fastness to light and to wet treatments.

EXAMPLE 8

The dispersion of the diazo compound obtained as described in Example 1 from 16.7 parts of sodium 3-chloro-4-amino-azobenzene-4'-sulfonate is combined, under the conditions described in Example 4, with a solution of 12.6 parts of acetoacetic acid 2,4-dimethoxyanilide is dimethylformamide and coupling is effected by adding sodium acetate. This gives the dye of the formula

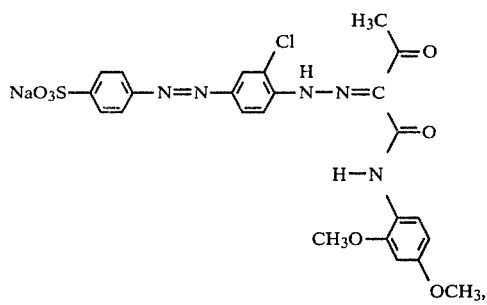

which dyes nylon material in a reddish yellow hue which has very good fastness to light and to wet treatments.

EXAMPLE 9

6 parts of acetylacetone, added all at once, and 250 parts of ice are introduced into the dispersion of the diazo compound of Example 1 and the pH is brought to 5 by adding 150 parts by volume of a saturated sodium acetate solution. After stirring overnight whilst the mixture returns to room temperature, the dye is filtered off, washed with a little water and stirred, in the form of a paste, into 500 parts by volume of water and 10 parts of hydrazine hydrate for 3 hours at ~40° C. After filtering off, washing with water and drying at 80° C., a yellow powder of the formula

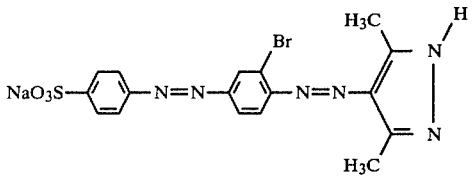

is obtained, which dyes nylon material in yellow hues having very good fastness to light and to wet treatments.

The dyes shown below are obtained by the methods described in Examples 1–3:

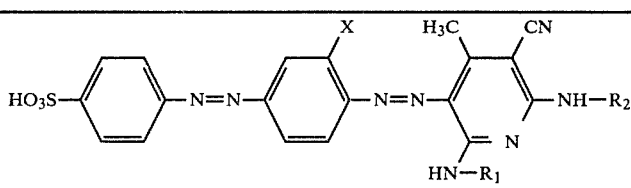

| Example | X | $R_1$ | $R_2$ | Hue |
|---|---|---|---|---|
| 10 | Cl | HO—$(CH_2)_2$— | —$(CH_2)_2OH$ | red |
| 11 | Br | " | " | " |
| 12 | Cl | $CH_3O(CH_2)_2$— | —$(CH_2)_2OCH_3$ | red |
| 13 | Br | " | " | " |
| 14 | Cl | $HO(CH_2)_2O(CH_2)_2$— | —$(CH_2)_2O(CH_2)_2OH$ | red |
| 15 | Cl | $HO(CH_2)_4O(CH_2)_3$— | —$(CH_2)_3O(CH_2)_4OH$ | red |
| 16 | Br | " | " | " |
| 17 | Cl | $HO(CH_2)_2O(CH_2)_2O(CH_2)_3$— | —$(CH_2)_3O(CH_2)_2O(CH_2)_2OH$ | red |
| 18 | Br | " | " | " |
| 19 | Cl | $CH_3O(CH_2)_2O(CH_2)_2O(CH_2)_3$— | —$(CH_2)_3O(CH_2)_2O(CH_2)_2OCH_3$ | red |
| 20 | Br | " | " | " |

| | | | | | |
|---|---|---|---|---|---|
| 21 | Cl | HO(CH₂)₂— | | —(CH₂)₂—C₆H₄—SO₃H | red |
| 22 | Br | " | | " | " |
| 23 | Cl | 4-OCH₃-3-methyl-C₆H₃-SO₃H | | —(CH₂)₃OCH₃ | dull bluish red |
| 24 | Br | " | | " | " |
| 25 | Cl | H— | | —(CH₂)₂OH | red |
| 26 | Br | H— | | " | " |
| 27 | Br | H— | | —(CH₂)₂O(CH₂)₂OH | red |
| 28 | Cl | H— | | —(CH₂)₃O(CH₂)₄OH | red |
| 29 | Br | H— | | " | " |
| 30 | Cl | H— | | —(CH₂)₂—C₆H₄—SO₃H | red |

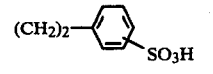

| Example | X | R₁ | R₂ | Hue |
|---|---|---|---|---|
| 31 | Cl | HO(CH₂)₂ | (CH₂)₂OH | red |
| 32 | Br | " | " | " |
| 33 | Cl | HO(CH₂)₂O(CH₂)₂ | (CH₂)₂O(CH₂)₂OH | red |
| 34 | Br | " | " | " |
| 35 | Cl | H | (CH₂)₂O(CH₂)₂OH | red |
| 36 | Br | H | " | " |
| 37 | Cl | H | —(CH₂)₂—C₆H₄—SO₃H | red |
| 38 | Br | H | " | " |

The following dyes may be obtained by the methods described in Examples 4–9:

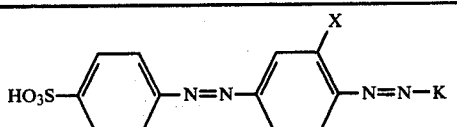

| Example | X | K | Hue |
|---|---|---|---|
| 39 | Br | 2-phenylindol-1-yl-(CH₂)₂CONH₂ | yellowish red |

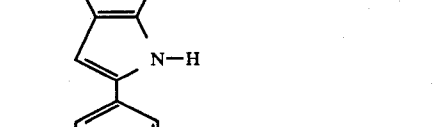

| Example | X | K | Hue |
|---|---|---|---|
| 40 | Cl | 6-SO₃H-2-phenylindol-1-yl (N—H) | yellowish red |
| 41 | Br | " | yellowish red |

-continued
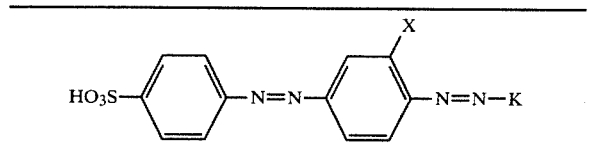
| Example | X | K | Hue |
|---|---|---|---|
| 42 | Cl | 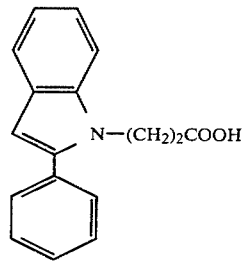 | yellowish red |
| 43 | Br | " | yellowish red |
| 44 | Cl | 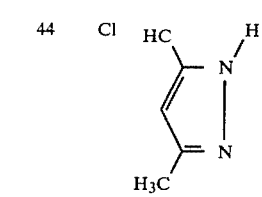 | yellow |
| 45 | Cl | 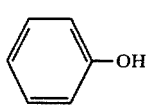 | yellow |
| 46 | Cl | 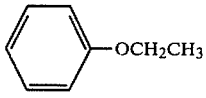 | yellow |
| 47 | Cl | 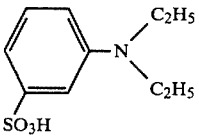 | dull bluish red |
| 48 | Br | " | dull bluish red |
| 49 | Cl | 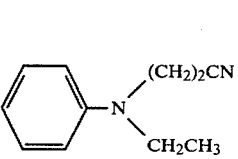 | red |
| 50 | Br | " | " |
| 51 | Cl | 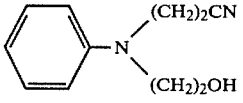 | red |
| 52 | Br | " | " |
| 53 | Cl | 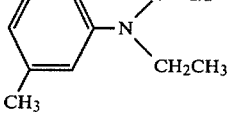 | red |
-continued
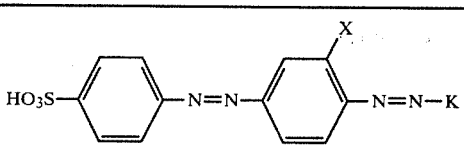
| Example | X | K | Hue |
|---|---|---|---|
| 54 | Br | | " |
| 55 | Cl | 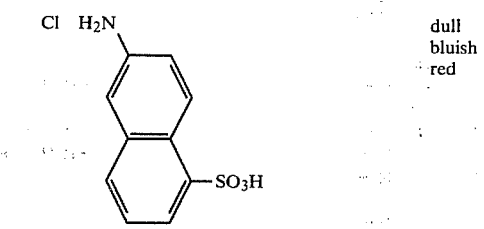 | dull bluish red |
| 56 | Br | " | " |
| 57 | Cl | 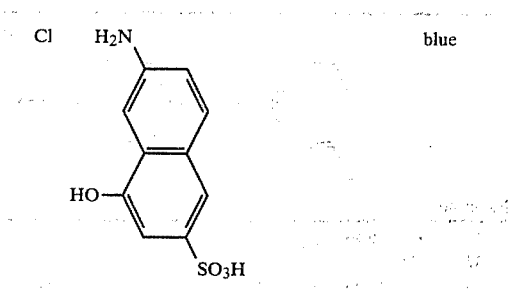 | blue |
| 58 | Br | 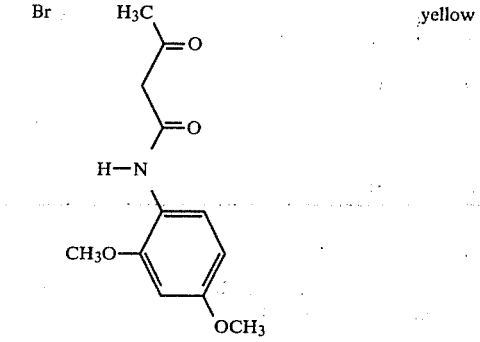 | yellow |
| 59 | Cl | 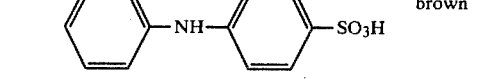 | yellowish brown |
| 60 | Br | " | yellowish brown |
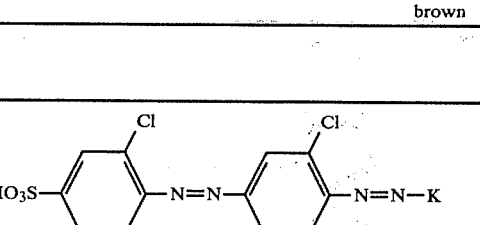
| Example | K | Hue |
|---|---|---|

| No. | Structure | Hue |
|---|---|---|
| 61 | 4-methyl-3-cyano-2-(2-hydroxyethylamino)-6-(2-hydroxyethylamino)pyridine | red |
| 62 | 4-methyl-3-cyano-2-(2-hydroxyethoxyethylamino)-6-(2-hydroxyethoxyethylamino)pyridine | red |
| 63 | 4-methyl-3-cyano-2-[2-(sulfophenyl)ethylamino]-6-amino-pyridine | red |
| 64 | 1-(2-carboxyethyl)-2-phenylindole | yellowish red |
| 65 | 3-(N,N-diethylamino)benzenesulfonic acid | dull bluish red |
| 66 | 6-amino-naphthalene-1-sulfonic acid (H₂N–naphthalene–SO₃H) | violet |

| Example | K | Hue |
|---|---|---|
| 67 | 4-methyl-3-cyano-2-(2-hydroxyethoxyethylamino)-6-(2-hydroxyethoxyethylamino)pyridine with K = HO₃S–(2,5-dichlorophenyl)–N=N–(3-chlorophenyl)–N=N– | red |
| 68 | 4-methyl-3-cyano-2-[2-(sulfophenyl)ethylamino]-6-[2-(sulfophenyl)ethylamino]pyridine | red |
| 69 | 3-(N,N-diethylamino)benzenesulfonic acid | dull bluish red |

Pyridine coupler (for Examples 70–73):

H₃C, CN on pyridine; D–N=N– at 5-position; –NH–(CH₂)₂O(CH₂)₂OH at 2-position; –NH–(CH₂)₂O(CH₂)₂OH at 6-position

| Example | D | Hue |
|---|---|---|
| 70 | 2-methoxy-5-methyl-4-sulfo-phenyl coupled with 3-bromo-4-methylphenyl (HO₃S–, OCH₃, CH₃ substituted phenyl–N=N–(3-Br,4-methyl)phenyl) | red |
| 71 | 2,6-dibromo-4-sulfo-phenyl–N=N–(3-chloro-4-methyl)phenyl | red |
| 72 | 5-sulfo-naphthalen-2-yl–N=N–(3-bromo-4-methyl)phenyl | red |
| 73 | 2-methoxy-5-sulfo-phenyl–N=N–(3-bromo-4-methyl)phenyl | red |

EXAMPLE 74

22.9 parts of sodium 3,5-dibromo-4-amino-azobenzene-4'-sulfonate are dispersed by pouring a solution in 350 parts by volume of water, which is still warm and contains 2 parts of an adduct of sperm oil alcohol and ethylene oxide (in the ratio of 1:25), onto 350 parts of ice and 17.5 parts by volume of a 23% strength sodium nitrite solution. The resulting mixture, which is at from 18° to 20° C., is acidified with 25 parts by volume of 10 N hydrochloric acid and stirred for one hour at from 20° to 25° C. This diazo mixture, when coupled, after destroying excess nitrous acid, to 15.5 parts of 2,6-bis-(2'-hydroxyethoxyethylamino)-3-cyano-4-methylpyridine by the method described in Example 1, gives a red dye of the formula

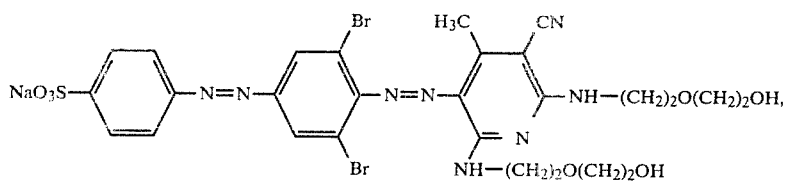

which dyes nylon in hues which have good fastness to light and to wet treatments.

EXAMPLE 75

A suspension of the diazo compound obtained from 22.9 parts of sodium 3,5-dibromo-4-amino-azobenzene-4′-sulfonate as described in Example 74 is run, at from 0° to +5° C., into a solution of 8.5 parts of N-cyanoethyl-N-methylaniline in 200 parts by volume of dimethylformamide, and the mixture is then buffered to pH 5 by dropwise addition of 125 parts by volume of a saturated sodium acetate solution. The resulting dye of the formula

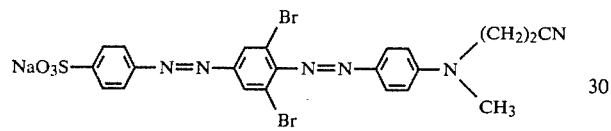

is filtered off, washed with 500 parts of volume of a 5% strength sodium chloride solution and dried at 80° C. This gives a brown water-soluble powder, which dyes nylon fabrics in reddish brown hues having very good lightfastness and wetfastness.

The following brown dyes are prepared by the methods described in Examples 74 and 75:

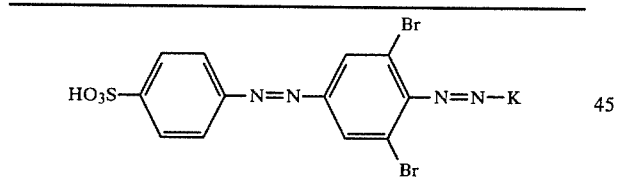

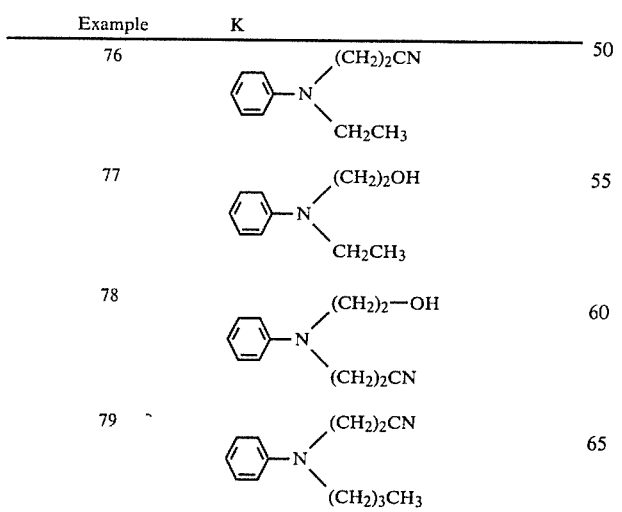

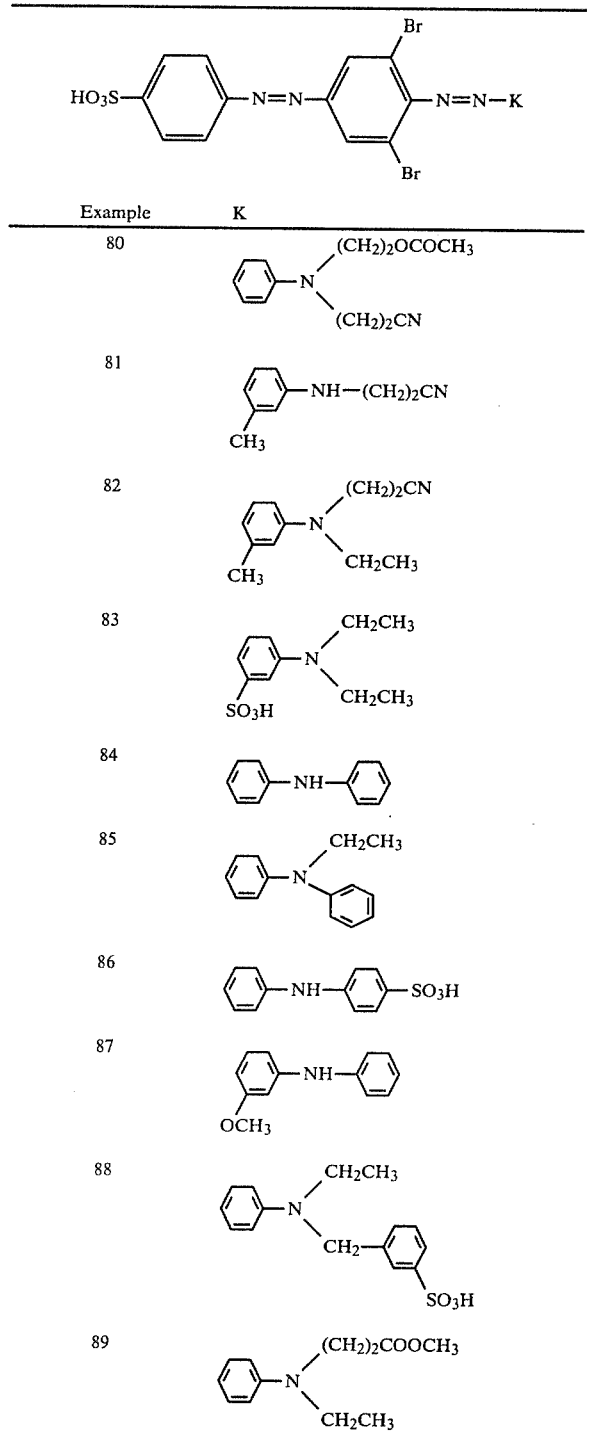

-continued

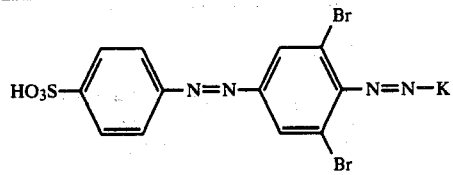

| Example | K |
|---|---|
| 90 | 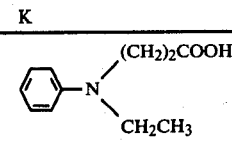 (phenyl-N with (CH₂)₂COOH and CH₂CH₃) |
| 91 | 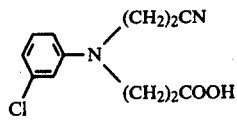 (3-chlorophenyl-N with (CH₂)₂CN and (CH₂)₂COOH) |

EXAMPLE 92

28.35 parts of the coupling product of the formula

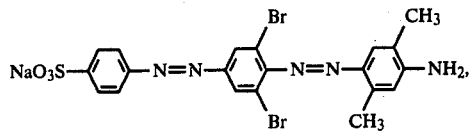

obtained as described in Example 75 are dissolved in 300 parts by volume of pyridine by heating to 100° C. 51 parts of acetic anhydride are slowly added dropwise, starting when the temperature has fallen to 60° C., and the reaction mixture is stirred for a further three hours at this temperature. The acetyl derivative which crystallizes out is then filtered off at room temperature, washed with acetone and dried in air. A brownish yellow powder is obtained, which dissolves in hot water and dyes nylon material in a brownish yellow hue having good fastness to light and to wet treatments.

The following dyes are synthesized using succinic anhydride in place of acetic anhydride and following the method of the above Example:

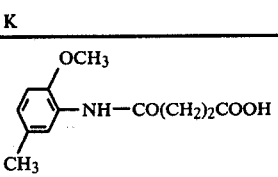

| Example | K | Hue |
|---|---|---|
| 93 | 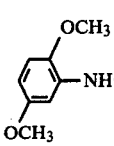 (3-methylphenyl)—NH—CO(CH₂)₂COOH | brownish yellow |
| 94 | (2,5-dimethylphenyl)—NH—CO(CH₂)₂COOH | brownish yellow |

-continued

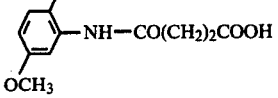

| Example | K | Hue |
|---|---|---|
| 95 | (2-OCH₃, 5-CH₃-phenyl)—NH—CO(CH₂)₂COOH | brownish yellow |
| 96 | (2,5-di-OCH₃-phenyl)—NH—CO(CH₂)₂COOH | brownish yellow |

The following dyes may be obtained by carrying out the diazotization as described in Example 74 and the coupling as described in Examples 1–9:

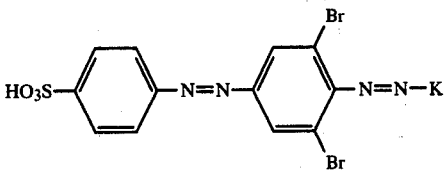

| Example | K | Hue |
|---|---|---|
| 97 | 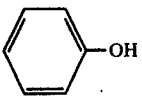 phenyl—OH | yellow |
| 98 | 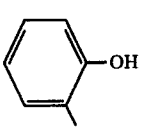 2-methylphenyl—OH | yellow |
| 99 | 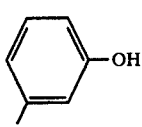 3-methylphenyl—OH | yellow |
| 100 | 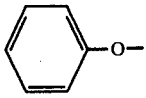 phenyl—O—CH₂CH₃ | yellow |
| 101 | 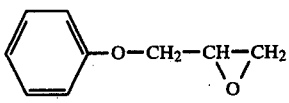 phenyl—O—CH₂—CH—CH₂ (epoxide) | yellow |

-continued
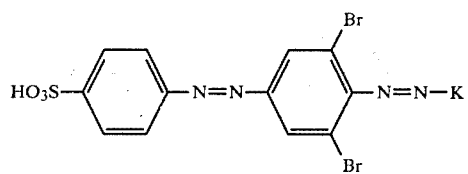
| Example | K | Hue |
|---|---|---|
| 102 | 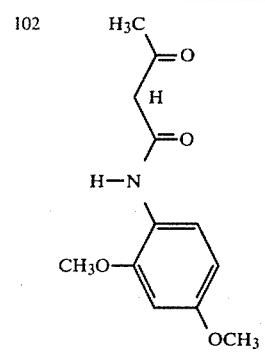 | yellow |
| 103 | 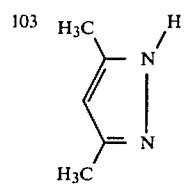 | yellow |
| 104 | 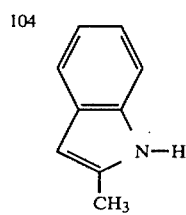 | orange |
| 105 | 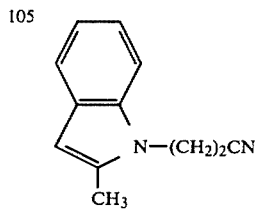 | orange |
| 106 | 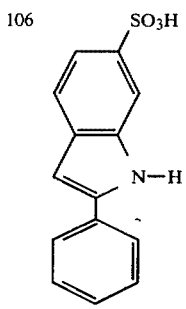 | orange |
-continued
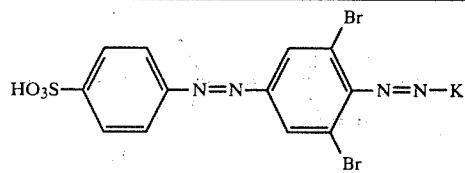
| Example | K | Hue |
|---|---|---|
| 107 | 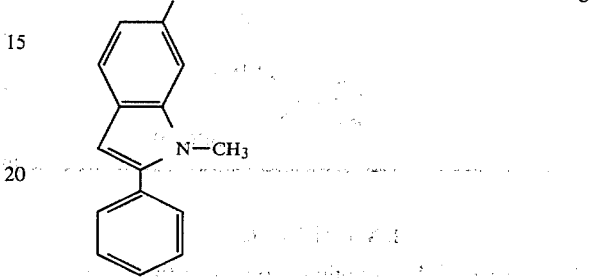 | orange |
| 108 | 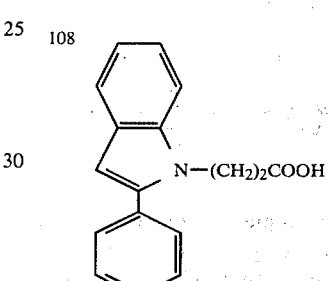 | orange |
| 109 | 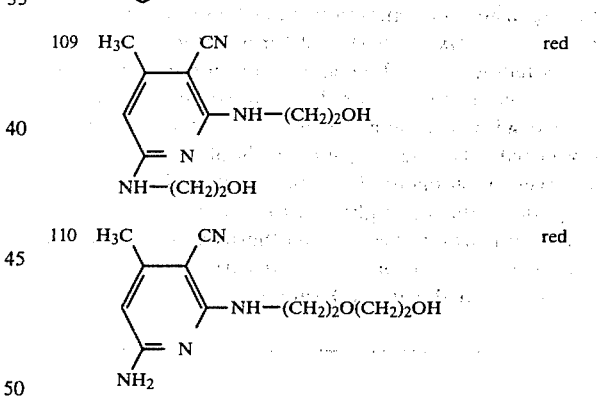 | red |
| 110 | 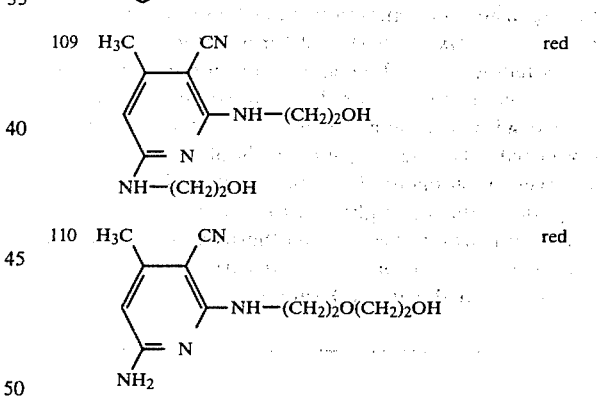 | red |
| 111 | 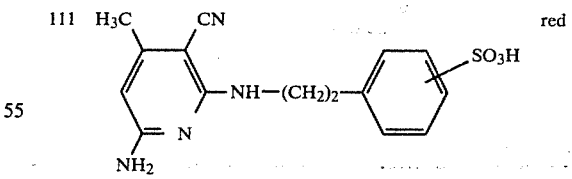 | red |
| 112 | 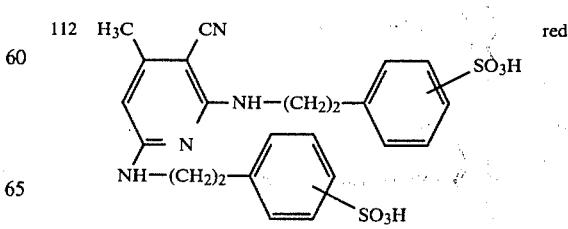 | red |

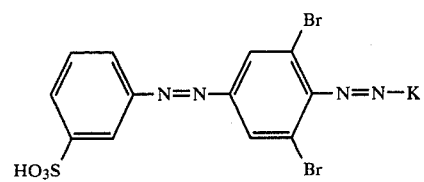

| Example | K | Hue |
|---|---|---|
| 113 | 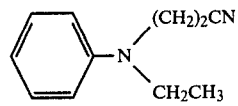 | brown |
| 114 | 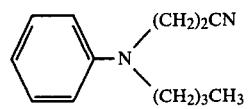 | brown |
| 115 | 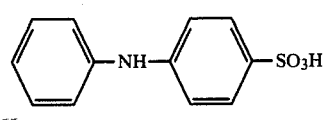 | brown |
| 116 | 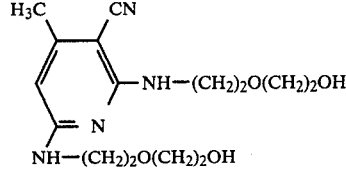 | red |
| 117 | 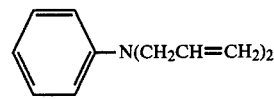 | brown |

-continued

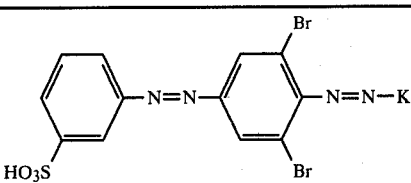

| Example | K | Hue |
|---|---|---|
| 118 | 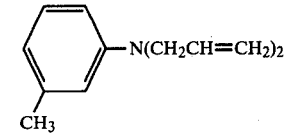 | brown |
| 119 | 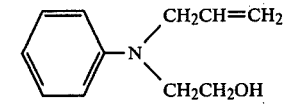 | brown |

We claim:

1. A disazo dye having the formula:

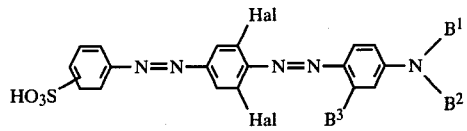

wherein
Hal is chlorine or bromine;
$B^1$ is hydrogen, $C_1$ or $C_4$ alkyl, $C_2$ or $C_3$ hydroxyalkyl, allyl, $C_2$ and $C_3$ alkyl substituted by $C_1$ to $C_4$ alkoxy or $C_1$ or $C_4$ alkanoyloxy, β-cyanoethyl, β-chloroethyl or β-hydroxy-γ-chloropropyl;
$B^2$ is the same as $B^1$ or is cyclohexyl, benzyl, sulfobenzyl, phenylethyl, sulfophenylethyl, phenyl or sulfophenyl; and
$B^3$ is hydrogen, chloro, methyl or $C_1$ to $C_4$ alkanoylamino.

2. The dye according to claim 1 of the formula

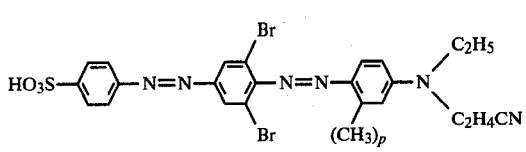

in which p is 0 or 1.

* * * * *